US006250700B1

(12) United States Patent
Traxler

(10) Patent No.: US 6,250,700 B1
(45) Date of Patent: Jun. 26, 2001

(54) ADJUSTABLE VEHICLE PARTITION

(76) Inventor: Michael A. Traxler, 4047 Montgomery Blvd., NE., Apt. B-1, Albuquerque, NM (US) 87109

(*) Notice: Subject to any disclaimer, the term of this patent is extended or adjusted under 35 U.S.C. 154(b) by 0 days.

(21) Appl. No.: 09/275,351

(22) Filed: Mar. 24, 1999

(51) Int. Cl.$^7$ .................. B60P 3/00; B60P 3/04; B60P 7/135; B61D 45/00
(52) U.S. Cl. .......... 296/24.1; 410/135; 160/135
(58) Field of Search ............ 296/24.1, DIG. 1; 160/135, 351, 352; 410/117, 118, 121, 122, 127, 129, 130, 143–146, 150, 135, 140, 94

(56) References Cited

U.S. PATENT DOCUMENTS

| 1,064,130 | * | 6/1913 | Conlin | 410/145 |
| 1,611,248 | | 12/1926 | Smith et al. | . |
| 1,813,269 | * | 7/1931 | Barrett | 410/127 |
| 2,219,412 | | 10/1940 | Dean | . |
| 2,348,561 | * | 5/1944 | Mutch | 160/135 |

(List continued on next page.)

FOREIGN PATENT DOCUMENTS

| 1092327 | * | 11/1960 | (DE) | 296/24.1 |
| 0252743 | * | 3/1967 | (DE) | 296/24.1 |

*Primary Examiner*—D. Glenn Dayoan
*Assistant Examiner*—H. Gutman
(74) *Attorney, Agent, or Firm*—Nancy E. Ownbey; Jeffrey D. Myers; Deborah A. Peacock

(57) ABSTRACT

An apparatus and method for partitioning a vehicle, particularly for use with public safety vehicles, in transporting prisoners, a prisoner and canine, or a prisoner and equipment. The invention comprises a partition mounted adjustably on a mounting bracket. The partition slides along the mounting rails for side to side adjustment. The partition is hinged at the mounting bracket to allow opening of the partition flat against the wall.

13 Claims, 4 Drawing Sheets

U.S. PATENT DOCUMENTS

| | | | |
|---|---|---|---|
| 2,826,156 | * | 3/1958 | Hall .................................... 410/129 |
| 2,853,339 | * | 9/1958 | Lazarus ................................ 296/84 |
| 2,859,048 | * | 11/1958 | Munn ................................ 280/150 |
| 2,865,670 | * | 12/1958 | Dunn ............................ 296/DIG. 1 |
| 2,998,279 | * | 8/1961 | Mateny ......................... 296/DIG. 1 |
| 3,044,800 | * | 7/1962 | Wicker .............................. 280/150 |
| 3,057,284 | * | 10/1962 | Learmont .......................... 296/24.1 |
| 3,169,781 | | 2/1965 | Abruzzino . |
| 3,190,687 | | 6/1965 | Johnson . |
| 3,397,005 | * | 8/1968 | May et al. ......................... 296/24.1 |
| 3,441,309 | * | 4/1969 | Halstead et al. ................... 296/24.1 |
| 3,468,556 | * | 9/1969 | Smith ................................ 280/150 |
| 3,469,090 | * | 9/1969 | Redus ............................... 296/24.1 |
| 3,510,164 | * | 5/1970 | Setina ............................... 296/24.1 |
| 3,549,195 | * | 12/1970 | Kallinikos . |
| 3,652,120 | | 3/1972 | Bernbach . |
| 3,666,313 | * | 5/1972 | Halstead et al. ................... 296/24.1 |
| 3,667,801 | * | 6/1972 | Setina ............................... 296/24.1 |
| 4,015,875 | * | 4/1977 | Setina ........................... 296/DIG. 1 |
| 4,095,837 | * | 6/1978 | Hunter ............................. 296/24.1 |
| 4,103,934 | * | 8/1978 | Arnholt et al. ..................... 280/744 |
| 4,159,141 | | 6/1979 | Dirck . |
| 4,173,369 | * | 11/1979 | Roggin .............................. 296/24.1 |
| 4,200,046 | * | 4/1980 | Koliba et al. ........................ 410/94 |
| 4,227,735 | | 10/1980 | Joyner . |
| 4,278,145 | * | 7/1981 | Eade et al. .......................... 160/135 |
| 4,444,240 | * | 4/1984 | Bannister ............................ 160/135 |
| 4,470,228 | * | 9/1984 | Dirck ................................ 296/24.1 |
| 4,509,788 | | 4/1985 | Jan et al. . |
| 4,546,728 | | 10/1985 | May . |
| 4,592,523 | | 6/1986 | Herndon . |
| 4,781,498 | * | 11/1988 | Cox ...................................... 410/118 |
| 4,796,913 | * | 1/1989 | Amabile et al. ..................... 280/751 |
| 4,919,467 | | 4/1990 | Guimelli . |
| 4,924,814 | | 5/1990 | Beaudet . |
| 4,947,883 | | 8/1990 | Mayo . |
| 4,955,771 | * | 9/1990 | Bott ....................................... 410/94 |
| 4,964,666 | | 10/1990 | Dillon . |
| 4,971,378 | * | 11/1990 | Setina ........................... 296/DIG. 1 |
| 5,004,286 | | 4/1991 | Taylor, III et al. . |
| 5,035,184 | * | 7/1991 | Bott .................................... 410/130 |
| 5,054,837 | | 10/1991 | Chapman . |
| 5,058,941 | * | 10/1991 | Solomon et al. . |
| 5,069,497 | * | 12/1991 | Clelland ............................. 296/24.1 |
| 5,080,416 | * | 1/1992 | Dirck . |
| 5,167,479 | * | 12/1992 | Bott .................................... 410/121 |
| 5,207,260 | * | 5/1993 | Commesso ......................... 296/24.1 |
| 5,427,486 | * | 6/1995 | Green ................................. 296/24.1 |
| 5,511,842 | * | 4/1996 | Dillon . |
| 5,536,057 | * | 7/1996 | Stewart . |
| 5,735,654 | * | 4/1998 | Coogan . |
| 5,749,599 | * | 5/1998 | Gardner .............................. 280/748 |
| 5,779,271 | * | 7/1998 | Dorow et al. ....................... 280/751 |
| 5,848,817 | * | 12/1998 | Niehaus . |
| 5,971,487 | * | 10/1999 | Passehl .............................. 296/24.1 |
| 6,109,847 | * | 8/2000 | Patel et al. ............................ 410/94 |
| 6,149,040 | * | 11/2000 | Walker ................................ 410/145 |

* cited by examiner

ADJUSTABLE VEHICLE PARTITION

CROSS-REFERENCE TO RELATED APPLICATIONS

This application claims the benefit of the filing of U.S. Provisional Patent Application Ser. No. 60/079,513, entitled Adjustable Vehicle Partition, filed on Mar. 26, 1998, and the specification thereof is incorporated herein by reference.

BACKGROUND OF THE INVENTION

1. Field of the Invention (Technical Field)

The present invention relates to an apparatus for dividing the seating space of a vehicle, using a rigid unit to adjustably compartmentalize the seat. The present invention is also a method for partitioning a vehicle seating space.

2. Background Art

Law enforcement officers have often encountered problems in the physical transportation of belligerent or intoxicated individuals. Often the individual lies down, posing a suffocation problem in intoxicated individuals, or, in the case of belligerent persons, kick or slam the windows with their heads or feet. This poses not only a potential injury problem, but also a risk of property damage to the officer's automobile.

In addition, the goal to uneventfully transport more than one individual per seat has been difficult, if not impossible, due to the inability to prevent physical contact between the two.

Traditional law enforcement vehicles utilize a barrier between the front seat and back seat of the vehicle. While this barrier serves as a means of protection for the officer, its design necessarily prevents the officer from physically controlling the individual(s) within the back seat. Handcuffing the individuals to some portion of the back seat limits their movement somewhat, but still does not prevent lying down, kicking, or head-thrashing.

Yet another obstacle to transporting restrained individuals is encountered in the situation of two officers: traditionally, an officer has to put his/her equipment in the passenger front seat With two officers, there is no convenient place for such equipment; the back seat is not available for such a use because of the presence of the individuals to be transported. A further problem arises when the officer(s) are accompanied by a canine.

Many inventions have dealt with confinement, separation and safety issues by compartmentalizing the front seat from the back seat. These include the following: U.S. Pat. No. 3,190,687, to Johnson, entitled Sectionalizing Barrier for Automobiles; U.S. Pat. No. 4,919,467, to Guimelli, entitled Vehicle Safety Screen Fixing Means; U.S. Pat. No. 4,964,666, to Dillon, entitled Mounting System for Security Shield in Police Vehicles; U.S. Pat. No. 5,511,842, to Dillon, entitled Security Vehicle System; U.S. Pat. No. 5,735,564, to Coogan, entitled Luggage Safety Barrier, U.S. Pat. No. 4,924,815, to Beaudet, entitled Pet Restrainer for Passenger Vehicles; U.S. Pat. No. 3,169,781, to Abruzzino, entitled Safety Net for Vehicle Occupants; U.S. Pat. No. 5,536,057, to Stewart, entitled Vehicle Partition; and U.S. Pat. No. 5,058,941, to Solomon et. al., entitled Vehicle Interior Barrier.

Others recognized the need to protect the driver, e.g. in taxicabs and buses. This led to the development of rigid, immovable enclosures around the driving space. Such inventions include U.S. Pat. No. 4,227,735, to Joyner, entitled Protective Enclosure for a Bus Driver, U.S. Pat. No. 5,004,286, to Taylor, III et. al., entitled Transport Vehicle Protective Shield; U.S. Pat. No. 4,509,788, to Jan et. al., entitled Safety Arrangement in a Taxi; U.S. Pat. No. 1,611,248, to Smith, et. al., entitled Automobile Body; and U.S. Pat. No. 3,549,195, to Kallinikos, entitled Driver Protective Apparatus for Taxicab.

Other patents that involve protecting individuals or animals utilize vastly different mechanisms, and include U.S. Pat. No. 4,592,523, to Herndon, entitled Ejection Seat Restraint System for Limbs and Head, disclosing a net that encompasses the pilot; U.S. Pat. No. 4,947,883, to Mayo, entitled Infant Sun Shade Apparatus, disclosing a malleable sunshield that is placed around a seated infant; U.S. Pat. No. 4,546,728, to May, entitled Animals Transportation Container, disclosing an animal cage that encompasses the entire rear seat of a vehicle; and U.S. Pat. No. 2,219,412, to Dean, entitled Transfer Cell for Automobiles, disclosing a prisoner cage encompassing the entire rear seat of a vehicle.

Several other inventions provided a device for dividing a rear vehicle seat, but were not suited for the needs of transporting potentially dangerous individuals. These include U.S. Pat. No. 5,054,837, to Chapman, entitled Vehicular Child Divider Apparatus, disclosing a soft panel that is removably hooked over the seat; and U.S. Pat. No. 3,652,120, to Bernbach, entitled Child Restraining Gate for Automobiles, disclosing a gate mounted to enclose the entire seat excluding the floor space.

These above-referenced patents provided some measure of security, but did not even address the problem of transporting multiple individuals. In response to this need, pressure was put upon the industry to create variations of a barrier that allows multiple prisoner transport. Patents in this category include U.S. Pat. No. 4,159,141, to Dirck, entitled Security Vehicle Such as for Transporting Prisoners Having Double Doors, and U.S. Pat. No. 5,680,416, to Dirck, entitled Prisoner Transport Module. These patents disclose a vertical, non-adjustable lengthwise barrier permanently fixed to divide the rear portion of a van.

The need to isolate a passenger seat from the front seat led to the development of yet another type of divider, disclosed in U.S. Pat. No. 5,848,817, to Niehaus, entitled Vehicle Security Cage. In Niehaus, the divider is a fixed L-shape divider installed to compartmentalize one section (approximately ⅓) of the rear seat. It is made of metal or glass, and intentionally leaves open access between the driver's seat and the other portion of the rear seat. This configuration would allow for safe transport of only one prisoner, and does not address the issues relating to violent or intoxicated individuals. Also, it cannot be used in a vehicle that has an existing front-and-rear seat barrier, as do many public safety and police vehicles.

The present invention is an apparatus for dividing a seat, such as a back seat, of a vehicle. It successfully addresses the problems encountered in situations of transporting belligerent or intoxicated individuals or prisoners, and transporting multiple persons, or a canine and a restrained person. It also addresses the problem of safely carrying an officer's equipment.

SUMMARY OF THE INVENTION (DISCLOSURE OF THE INVENTION)

A preferred embodiment of the present invention comprises an apparatus for partitioning a seat of a vehicle comprising a mounting mechanism disposable in the back of a vehicle, and a partition positionally moveable and adjustable from side to side in the back of the vehicle across said mounting mechanism. Preferably the mounting mechanism comprises rails. Preferably the partition is hinged to open flat against the mounting mechanism. The partition preferably comprises plastic or metal. In a preferred embodiment of the invention, the partition further comprises a frame surrounding the perimeter of the partition, preferably of metal, and optionally comprising padding. One embodiment of the invention comprises a partition further comprising cross-bracing. A sliding arm, preferably comprising an adjustment mechanism, more preferably at least two pins and at least two pinholes, is preferably adjustably glidable along the cross-bracing. The sliding arm is preferably also glidably situated on the rail of the mounting mechanism.

The present invention also comprises a method of isolating and restraining at least one individual in a seat of a vehicle using an adjustable vehicle partition comprising placing the individual in the vehicle and moving and adjusting a partition disposable in the vehicle seat from side to side in the vehicle seat. In a preferred embodiment, an individual is placed on one side of the partition in the seat. Preferably the partition slides from side to side along a mounting mechanism. The step of sliding an adjustable vehicle partition preferably comprises sliding a partition comprising a partition and a frame from side to side along a mounting mechanism, preferably wherein the partition comprises plastic or metal, and preferably where the partition is hinged to open flat against the mounting mechanism. Preferably, the partition is moved and adjusted to create a vacant side of the seat. In a preferred embodiment of the present invention, a second vehicle is placed on the vacant side of the partition. Alternatively, police equipment or a canine is placed on the vacant side of the partition.

A primary object of the present invention is to provide an apparatus that adjustably divides a seat of a vehicle.

Another object of the present invention is to provide an apparatus that partitions a seat of a vehicle, yet can be positioned for full access to the entire seat.

A further object of the present invention is to provide an apparatus that keeps a prisoner/individual upright and restrained in the back seat of a vehicle.

Still another object of the present invention is to provide an apparatus that reduces cost of transporting multiple prisoners by decreasing the number of vehicles required.

A primary advantage of the present invention is the creation of a partition that is adjustable to accommodate different individuals.

Another advantage of the present invention is the ability to fold the partition flat to obtain access to the entire seat to which the partition is installed.

A further advantage of the present invention is the ability to transport more than one individual per seat safely.

Yet another advantage of the present invention is the ability to transport an individual in the same seat as police equipment without interaction between the two.

Still another advantage of the present invention is the ability to transport an individual and a canine in the same seat without the possibility of interaction.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
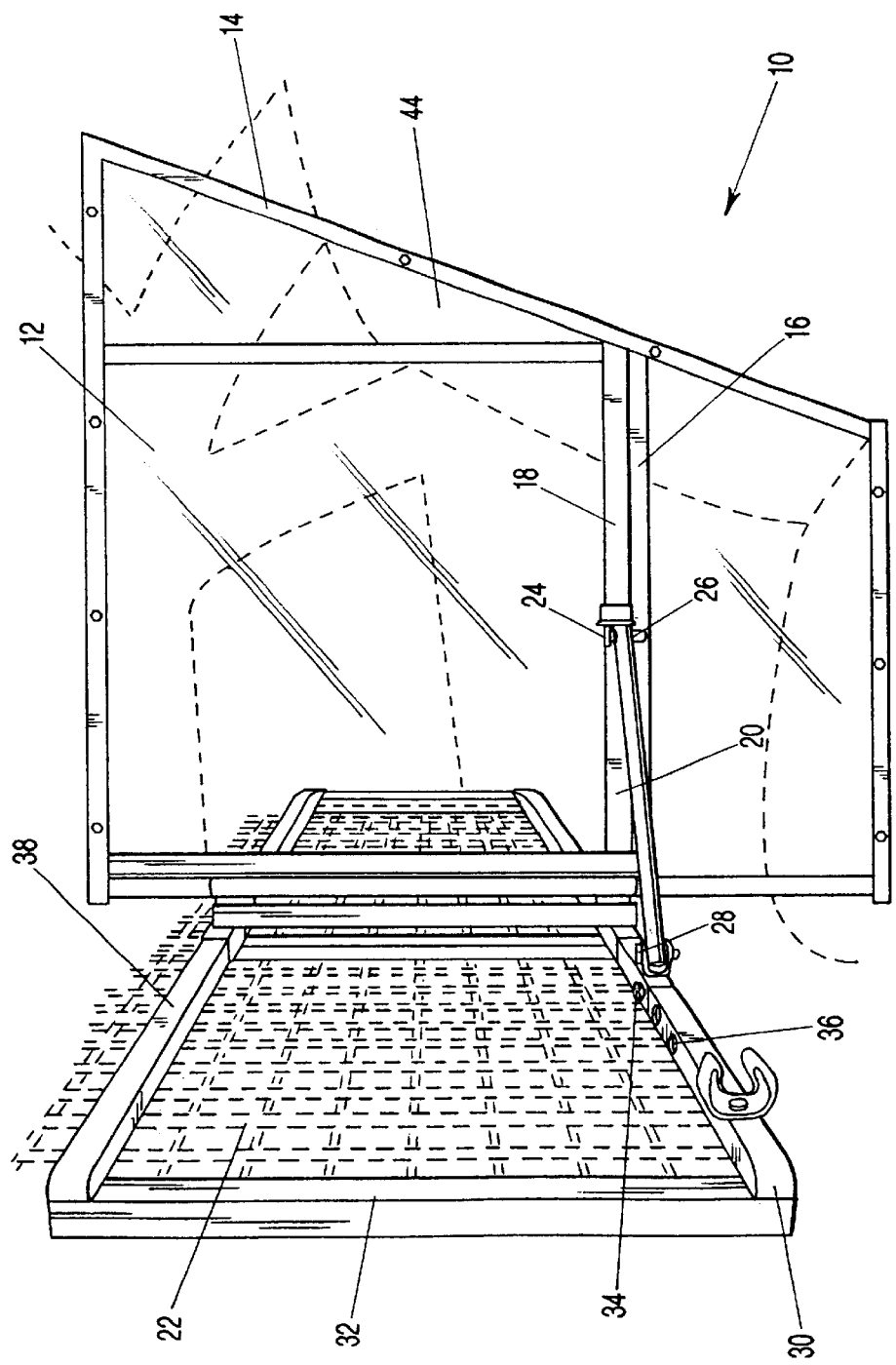
FIG. 1 is side view of a preferred embodiment of the apparatus.
Figure 2:
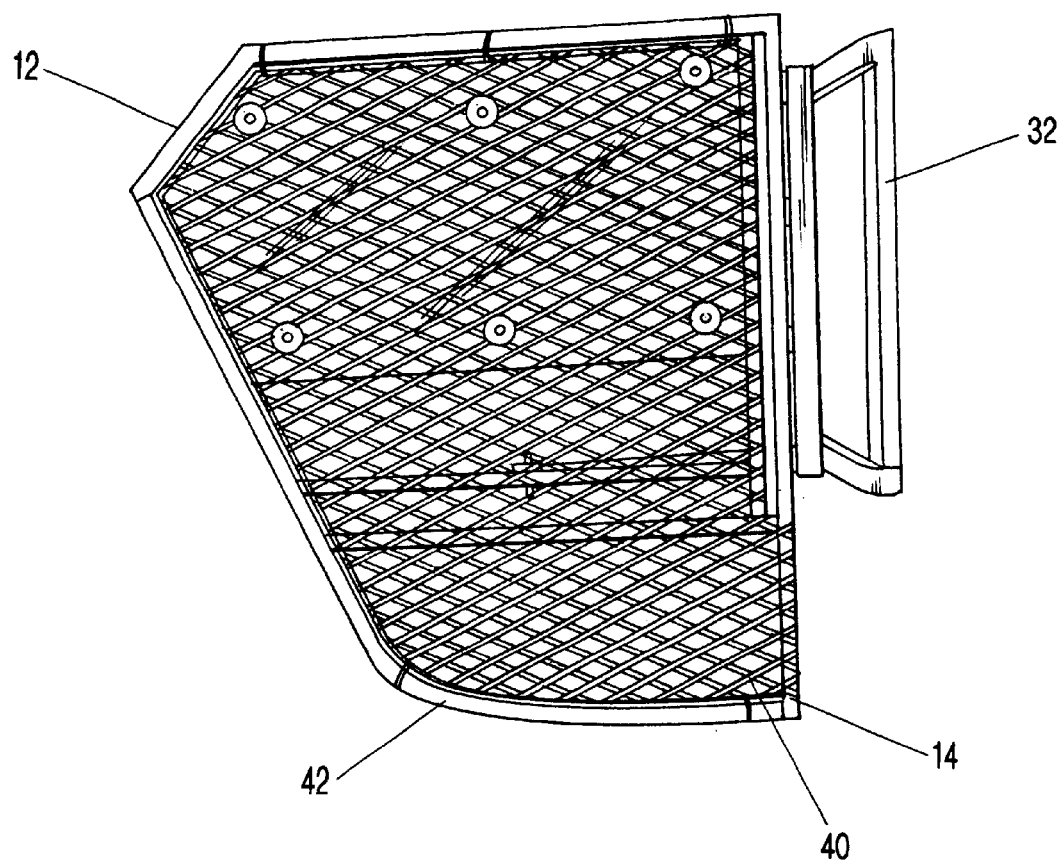
FIG. 2 is side view of an alternative embodiment of the apparatus.
Figure 3:
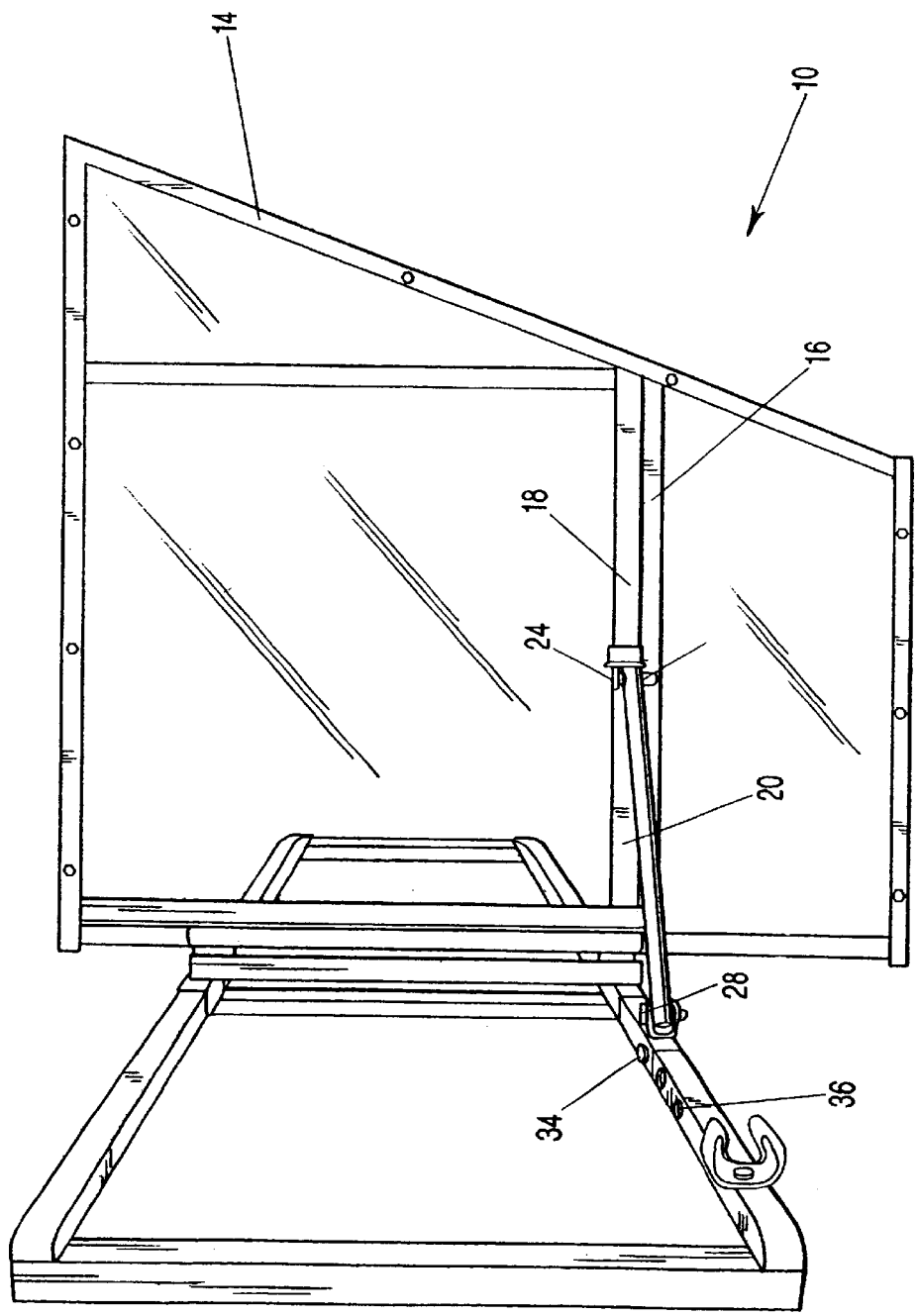
FIG. 3 is a side view of a preferred embodiment of the apparatus.
Figure 4:
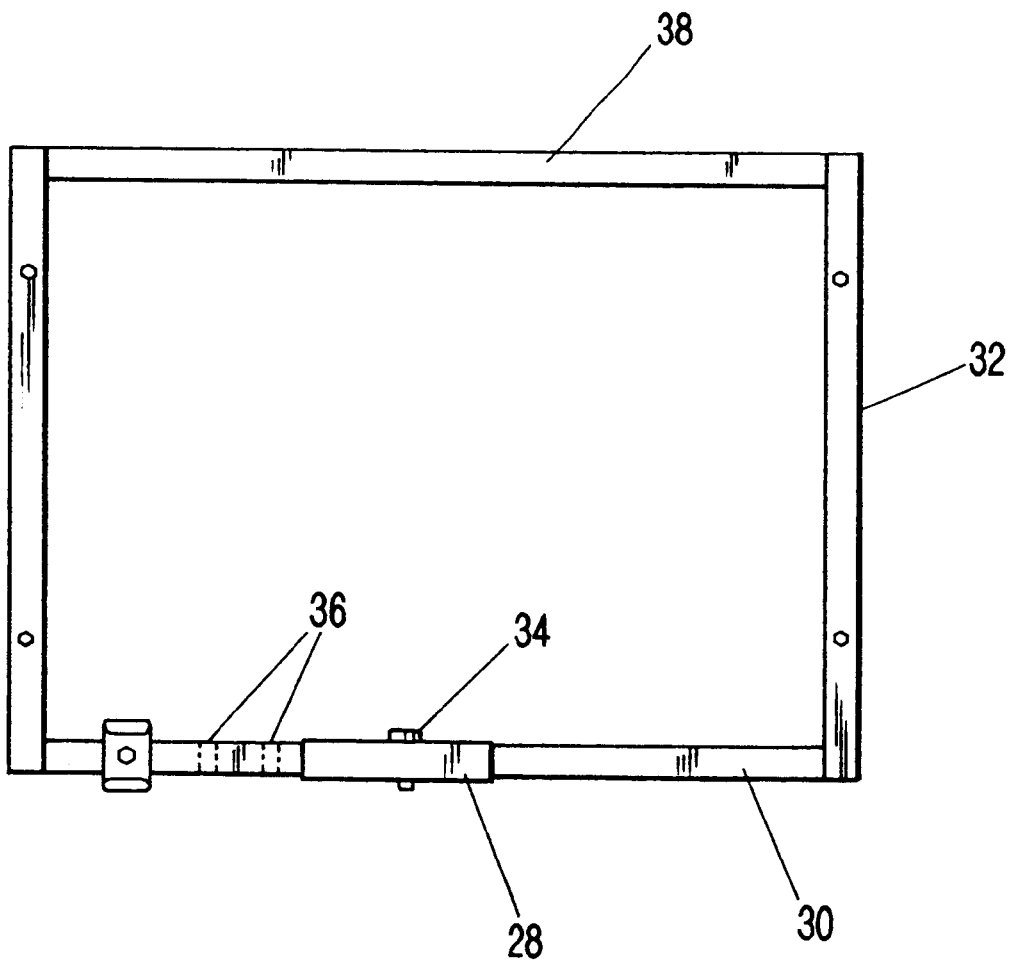
FIG. 4 is a front view of a preferred embodiment of the mounting mechanism.

A preferred embodiment of the apparatus is shown in FIGS. 1, 2, and 4. As shown in FIGS. 1 and 3, vehicle partition 10 comprises hinged door 12 made preferably of a hard, clear material such as Plexiglas or Lexan, and alternatively having metal cross-bracing 40, as shown in FIG. 2. Door 12 comprises frame 14 preferably made of metal, and most preferably steel, surrounding its perimeter. In one embodiment, frame 14 is surrounded by padding 42 as shown in FIG. 2, to help prevent injury to those individuals being transported. Attached to frame 14 is cross-member 16, provided for added support. Adjacent to cross-member 16 is slide support 18 along which slide arm 20 is moved to allow door 12 to close to partition the vehicle seat 44, or to open flat against the divider between the front and back seats, shown as barrier 22. This feature is useful when transporting a particularly belligerent individual, as it allows for a two-man technique to seat the person. Locking pin 24 is removably situated in pinhole 26 on slide support 18. When locking pin 24 is in pinhole 26, door 12 is locked in closed position. When in closed position, one prisoner can be seated on each side of the partition, thereby preventing contact between the two. Alternatively, a prisoner may be positioned on one side of the partitions, and a canine on the other, to allow for safe transport of both. Yet another alternative is to transport a prisoner on one side of the partition, and police equipment on the other side, thereby freeing up the passenger side of the front seat for additional officer seating space.

The mounting and sliding mechanisms are shown in FIGS. 1 and 4. The other end of slide arm 20 is mounted to guide 28, which is positionally slidable on rail 30 of mounting bracket 32. Guide 28 contains pinhole 34, which can be aligned with one of a number of pinholes 36 on rail 30, to adjust side-to-side positioning within the vehicle. This allows for adjustment to accommodate the size of the individual being transported, or alternatively to pin violent prisoners sideways against the vehicle door to prevent them from injuring themselves or others, or damaging property. The ability to pin the individual against the vehicle door is also desired when transporting intoxicated or drugged individuals, to prevent them from lying down and removing themselves from the officer's visual field.

The top end of door frame 12 also is capable of sliding along top rail 38 of mounting bracket 32. In a preferred embodiment, mounting bracket 32 is fixed to the barrier separating the front and back seats by the use of four nuts and bolts.

The design of the vehicle partition is adaptable to any car or sport utility vehicle that has a metal cage or shield (e.g. Plexiglas shield) or barrier installed between the front and back seat, or alternatively the mounting mechanism may be mounted directly to the vehicle.

The preceding examples can be repeated with similar success by substituting the generically or specifically described materials and/or uses of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A partitioning apparatus comprising:

a mounting mechanism disposable in a rear passenger compartment of a motor vehicle; and a partition positionally movable from side to side within the compartment and adjustable along said mounting mechanism, wherein said partition further comprises cross-bracing and a sliding arm adjustably glidable along said cross-bracing.

2. The apparatus of claim 1 wherein said mounting mechanism comprises rails.

3. The apparatus of claim 2 wherein said sliding arm is glidably disposed situated on said rail of said mounting mechanism.

4. The apparatus of claim 1 wherein said partition is hinged to open perpendicular to said mounting mechanism.

5. The apparatus of claim 1 wherein said partition comprises at least one material selected from the group consisting of plastic and metal.

6. The apparatus of claim 1 wherein said partition further comprises a frame surrounding the perimeter of said partition.

7. The apparatus of claim 6 wherein said frame comprises a metal material.

8. The apparatus of claim 6 wherein said frame further comprises padding.

9. The apparatus of claim 1 wherein said partition is hinged to close flat against said mounting mechanism.

10. The apparatus of claim 1 wherein said sliding arm further comprises an adjustment mechanism.

11. The apparatus of claim 10 wherein said adjustment mechanism comprises at least two pins and at least two pinholes.

12. A method of isolating and restraining at least one individual in a rear passenger compartment of a motor vehicle using an adjustable motor vehicle partition, the method comprising the steps of:

a) placing the individual in the compartment;

b) moving and adjusting the adjustable motor vehicle partition disposable in the compartment from side to side within the compartment along a mounting mechanism; and c) locking in place the adjustable motor vehicle partition by means of a slidable arm connecting the partition to the mounting mechanism.

13. A partitioning apparatus comprising:

a mounting mechanism disposable in a rear passenger compartment of a motor vehicle;

a partition positionally movable and adjustable from side to side within the compartment along said mounting mechanism; and a slidable arm connecting the partition to the mounting mechanism, wherein said slidable arm can be locked in place.

* * * * *